Patented Feb. 23, 1954

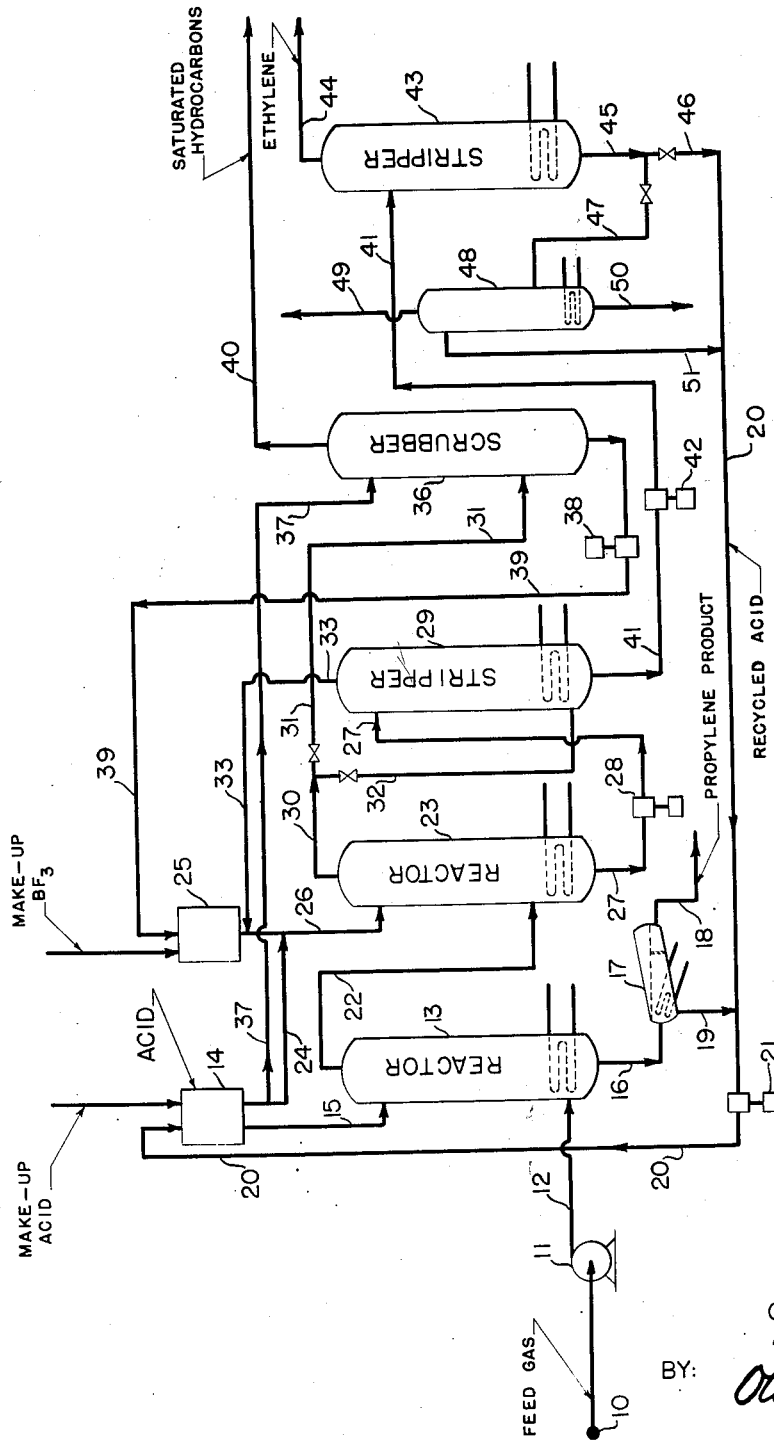

2,670,391

UNITED STATES PATENT OFFICE 2,670,391

RECOVERY OF ETHYLENE

Arthur P. Lien, Highland, and Carl E. Johnson, Griffith, Ind., assignors to Standard Oil Company, Chicago, Ill., a corporation of Indiana Application June 29, 1951, Serial No. 234,415

10 Claims. (Cl. 260—677)

This invention relates to a process for the separation of ethylene from a gas stream containing other constituents and refers particularly to the separation of ethylene from a refinery gas stream containing propylene and also saturated hydrocarbons. This application is a continuation-in-part of the inventors' copending application Ser. No. 226,945.

Ethylene is a notably useful constituent of such light hydrocarbon gases, for example, as are produced by the intensive cracking of petroleum stocks. It has also been produced by partial oxidation of ethane. Those fractions of hydrocarbon gases which contain ethylene contain also propylene, traces of higher olefinic homologs and varying proportions of saturated hydrocarbon gases. The separation of ethylene from these other constituents, for such purposes, for example, as the preparation of polyethylene, is particularly difficult and expensive.

A primary object of the present invention is the provision of a process for the recovery of ethylene from gases that contain ethylene, homologous olefinic hydrocarbons, and saturated hydrocarbons boiling within the same range. Another object of the invention is the provision of a process for the recovery of ethylene and propylene from refinery gas streams or the like containing the same. Yet another object of the invention is the provision of a process for the separation of ethylene from propylene and saturated gases and the simultaneous conversion of propylene to an ester or polymer. The invention has for other objects such other advantages or results as will be found to obtain in the specification or in the claims hereinafter made.

We have now accomplished the foregoing objects by providing a process which, briefly stated, comprises the steps, in combination, of bringing a gas stream containing saturated hydrocarbons, ethylene, and one or more higher boiling olefins into contact with an organic sulfonic acid to esterify the higher boiling olefins or catalytically to effect their polymerization, contacting the remaining mixture of ethylene and paraffinic hydrocarbons with an organic sulfonic acid-boron trifluoride complex to esterify the ethylene, discharging saturated gases substantially free of ethylene, stripping boron trifluoride from the resultant mixture of the ethyl sulfonate ester and any excess sulfonic acid and thermally decomposing the ethyl ester to liberate substantially pure ethylene. Included within the scope of the invention are improvements in process, such, for example, as regeneration of catalysts, esterifying agents, and the like. For the pupose of brevity these elements of the process combination will be hereinafter described in conjunction with a description of an operation of the process of the invention.

The feature, per se, of separating propylene from a gas stream containing propylene and ethylene is disclosed and claimed in U. S. 2,576,535. Organic sulfonic acids having an acid strength substantially equivalent to an alkanesulfonic acid having less than seven carbon atoms per molecule and being in a concentration of at least 90 weight percent, including methane-, ethane-, propane-, butanesulfonic acids, or mixtures of these, and benzene-, naphthalene-, or alkyl naphthalenesulfonic acids, are useful in effecting the polymerization of propylene and, under different conditions, have the property of esterifying the propylene. Alkanesulfonic acids or mixtures thereof having not more than seven carbon atoms per molecule are preferred since by their use within prescribed temperature limits substantially pure propyl esters or propyl polymers of selected size can be produced. The arylsulfonic acids, and sulfuric acid that is diluted to about 70% concentration, will selectively remove propylene from the gas stream but are not equivalent to the alkanesulfonic acid in the further object of the invention of providing substantially pure propyl esters and polymers of selected size.

Selected reaction temperatures effect different reactions in the propylene separation step. If the temperatures are maintained below about 60° C., e. g. 10° C. to 60° C., and preferably between about 20° and 40° C., esterification of the propylene and any other secondary olefins will result. If the reaction temperature is maintained between 60° and 120° C. and preferably at about 70° C., polymerization of the propylene and other secondary olefins will occur. At temperatures within a narrow range near the dividing point between esterification and polymerization temperature ranges, secondary esters and the sulfonic acid will react to form a mixture of the ester and polymer. Tertiary olefins such as isobutylene polymerize at ordinary temperature.

After a propylene ester and any excess sulfonic acid has been withdrawn from contact with the gas mixture, the propyl alkyl sulfonate can be heated to a temperature between about 60° and 150° C. and the propylene will be polymerized to form a mobile oil, thus liberating the acid. The liberated acid from which the said mobile oil has been decanted can be recycled. If the desired product is the propyl ester, excess acid can be neutralized and the product can be water washed. The ester can then be purified by fractional distillation. In another modification the propyl ester may be reacted with an isoparaffin (e. g., isobutane) or with aromatics (e. g., benzene) to provide valuable alkylate and at the same time to liberate the acid.

Propylene reacts with alkanesulfonic acids at a moderate rate at about 40 pounds per square inch gauge pressure and about 30° C., and it reacts somewhat more slowly at this temperature when the pressure is atmospheric. The required time of contact of propylene and alkanesulfonic acid depends considerably on the intimacy of contacting as well as on the temperature and pressure of the esterification; generally speaking, times of contact may be in the range of about ten minutes to about ten hours, the optimum time in any case being easily ascertainable by preliminary tests. Esterification of propylene proceeds more rapidly than its polymerization, and it was found that propylene polymerizes relatively slowly even at temperatures as high as 110° C. It is preferred, therefore, to employ the described procedure of first preparing the propyl alkanesulfonate and then decomposing the ester, in the presence of a catalytic amount of excess acid, in a separate zone.

The reaction temperature in the ethylene esterification step is maintained between about −20° and 75° C. and preferably between about 20° and 40° C. Esterification of the ethylene is catalyzed by a boron trifluoride-organic sulfonic acid complex. The concentration of boron-trifluoride in the complex can vary widely from 0.5 to 50 mol percent boron-trifluoride based on the mols of sulfonic acid employed, with a preferable range of 5 to 25 mol percent boron-trifluoride. The complex is preferably an alkanesulfonic acid complex in which the alkanesulfonic acid can contain from 1 to about 6 carbon atoms per molecule, inclusive. It is preferred to employ at least one mole of the sulfonic acid per mol of ethylene contained in the gas stream. The employment of acid in excess will ensure substantially complete esterification of the ethylene. The product ester is a liquid and is readily separable from the gas stream.

The ethylene-esterification reaction can be performed at atmospheric pressure but proceeds more readily at elevated pressures between about 10 and 60 atmospheres. If adequate contact between the acid complex and the ethylene is provided, the esterification reaction is quite rapid and will proceed to completion in a few minutes. On the other hand, if the contact is poor and low reaction temperatures such as 0° C. are employed, the esterification will take several hours.

After formation of the ester and separation of the gas stream, boron trifluoride contained in excess acid complex and any remaining in solution in the product is stripped from the product mixture by passing therethrough an inert gas at a temperature below about 80° C., the temperature above which ethylene polymerizes in the presence of boron trifluoride. After removal of boron trifluoride, decomposition of the ethylene ester and recovery of the liberated ethylene is accomplished at temperatures between about 150° and about 250° C. Lower temperatures within this range, preferably temperatures of about 150° to 180° C., provide decomposition of the ester and liberation of the ethylene while yet more completely avoiding formation of ethylene polymer.

In the drawing that is provided solely for purposes of illustrating the invention, the single figure is a schematic flow diagram of a preferred embodiment of the process of the invention, designed to separate pure ethylene from a refinery gas stream containing ethylene, propylene and saturated hydrocarbons boiling within the same range. For the purpose of brevity, valves, pumps, and like conventional apparatus are not shown, except where the function of such apparatus is necessary to a description of process operation.

Referring now to the drawing, a feed gas, obtained as a demethanized fraction of the hydrocarbon off-gases from a fluid catalytic cracking unit is delivered from a source 10 by blower 11 through line 12 to reactor 13. The composition of the gas as shown by an approximate mol ratio of its components is as follows:

20 mols methane
100 mols ethylene
210 mols ethane
125 mols propylene
60 mols propane
10 mols C4 hydrocarbons This mixed gas is delivered into reactor 13 at a rate of approximately 200,000 cubic feet per hour (measured at 15° C. and 1 atmosphere), and is passed therein in countercurrent contact with down-flowing mixed alkanesulfonic acid containing methane-, ethane-, and propanesulfonic acids and having the following characteristics:

*Mixed alkanesulfonic acids:*

Average molecular weight _____ 110–120
Specific gravity (25°/4° C.) _____ 1.30–1.35
Color _____ Light amber

*Composition, weight percent*

Alkanesulfonic acids _____ 94
Water _____ 3
$H_2SO_4$ _____ 3
Ash _____ Less than 0.05

The reactor is operated at a temperature of about 30° C. and the propylene in the gas stream reacts with the said sulfonic acids to form propylene esters. The alkanesulfonic acids are delivered at a rate of about 14,000 pounds per hour from storage vessel 14 through line 15 into reactor 13. Propylene ester, together with any small amounts of butylene ester, is withdrawn from reactor 13 with excess acid as a single liquid phase through line 16 into a separator 17 in which the solution is heated to between about 60° and 120° C. and preferably to about 70° C. The propyl ester decomposes to release acid and propylene, which polymerizes to form a mobile oil. The propylene polymer is decanted from separator 17 and is withdrawn therefrom through line 18 to storage. The excess acid and the released acid are withdrawn from the separator through line 19 and recycled through line 20 by means of pump 21 to acid storage 14. Any butyl ester is likewise decomposed to give butylene polymer; when isobutylene is present, its polymer may form a separate liquid phase which can be withdrawn with the acid-ester phase.

Gas from which propylene has been substantially entirely removed and which contains ethylene and saturated hydrocarbons flows from reactor 13 at a rate of about 156,000 cubic feet per hour through line 22 into reactor 23 in which the gas passes in direct countercurrent contact with down-flowing boron trifluoride-sulfonic acid complex. At the beginning of plant operation, this complex is formed and introduced into reactor 23 in the following manner. Alkanesulfonic acid is delivered from storage vessel 14 through a line 24 at a rate of about 14,000 pounds per hour. The acid mixes and forms a complex with boron trifluoride that is delivered at a rate of about 700 pounds per hour from storage vessel 25 through line 26. As operation continues, the catalyst complex will be recycled to storage vessel 25 and only make-up complex need be produced.

Ethyl alkanesulfonate is formed in reactor 23 by reaction of the ethylene contained in the introduced gases with the alkanesulfonic acid of the complex in the presence of the catalytic boron trifluoride at a temperature of about 40° C. The so-formed liquid ethyl alkanesulfonate and any excess boron trifluoride-sulfonic acid complex are withdrawn from the reactor through line 27 and are delivered by pump 28 to stripper column 29.

Light saturated hydrocarbon gases from which ethylene and propylene are substantially entirely removed flow at a rate of about 16,000 feet per hour from reactor 23 through line 30 to the juncture of valved lines 31 and 32 in each of which lines a predetermined proportional amount of the hydrocarbon gases is directed. Hydrocarbon gases from line 32 are introduced into stripper 29 at a point near the base of this column. These hydrocarbon gases rise in countercurrent contact with downflowing liquid comprising ethyl ester, excess boron trifluoride-sulfonic acid complex, and any dissolved boron-trifluoride, which liquid is maintained in the stripper at a temperature less than about 80° C. Under these conditions the rising hydrocarbon gases strip out substantially entirely the boron trifluoride content of the liquid. Liberated boron trifluoride passes overhead through line 33 and is introduced into the stream of boron trifluoride flowing from storage vessel 25 in line 26. A small volume of saturated hydrocarbon gases will be recycled with the boron trifluoride and will be liberated therefrom in the reactor 23.

A portion of the light hydrocarbon gases is directed through valved line 31 into a scrubber 36 wherein the said gases rise in countercurrent contact with downflowing liquid alkanesulfonic acids at a temperature of —10° to 50° C., preferably 5° to 35° C. The alkanesulfonic acids are delivered from storage vessel 14 through line 37 into the scrubber 36. Boron trifluoride liberated from the complex with sulfonic acid in the reactor 23 is absorbed in the downflowing sulfonic acids in the scrubber 36.

Sulfonic acid containing absorbed boron-trifluoride as a complex in the acid is withdrawn from the scrubber 36 through a line 39 and is pumped by a pump 38 through the line 39 into the storage vessel 25. In the course of preparing boron trifluoride-sulfonic acid complex for the esterification of ethylene, it is observed that not only are substantially all traces of boron-trifluoride removed from the effluent saturated hydrocarbon gases, but also any loss of boron trifluoride from the system is substantially entirely eliminated. These light saturated hydrocarbon gases flow from the top of the reactor 36 through line 40 to storage or utilization means, not shown.

Ethyl alkanesulfonic acid ester and excess sulfonic acid are withdrawn through line 41 from the stripper 29 and are pumped by pump 42 into stripper 43. Because of the fact that boron trifluoride has been substantially entirely removed from this liquid product containing the ethylene ester and sulfonic acid, temperatures between 150° to 250° C. can be employed to decompose the ester without encountering substantial polymerization of the ethylene. As hereinbefore noted, the lower temperatures within the range and preferably temperatures between 150° to 180° C. inclusive, will effect decomposition of the ethyl ester while encountering the least possibility of any ethylene polymerization. The so-liberated ethylene flows at a rate of about 36,000 cubic feet from the stripper 43 through a line 44 to storage utilization means, not shown.

Alkanesulfonic acid is withdrawn from the base of the said stripper 43 through line 45 to the juncture of valved lines 46 and 47. That portion of the alkanesulfonic acid which flows through line 47 is directed into a regenerator 48. Alkanesulfonic acid in regenerator 48 is heated to remove highly volatile contaminants which are discharged through line 49. The regenerator 48 is generally operated under a vacuum provided by apparatus not shown. Accumulated sludge is withdrawn from the base of the regenerator 48 through a discharge line 50. Regenerated alkanesulfonic acid is removed as a sidestream from regenerator 48 through a line 51, from which the regenerated acid flows into line 20 and is recycled by pump 21 to acid storage 14.

The remaining portion of the alkanesulfonic acid withdrawn from the stripper 43 flows through valved line 46 and through the line 20 and is also recycled by pump 21 to acid storage vessel 14. Ordinarily, only a small portion of the withdrawn acid need be regenerated in order to maintain the quality of the reactant sulfonic acid. Variations in operating conditions will, of course, vary the life of the employed sulfonic acid.

The process herein described presents numerous advantages over known processes for ethylene concentration. For example, the costly step of low-temperature fractionation to segregate an ethylene-ethane stream from lower- and higher-boiling gases is eliminated. Furthermore, our direct removal of ethylene from saturated gases by chemical reaction to form the ester is much more efficient than processes involving oil absorption or hypersorption.

Having described our invention, we claim:

1. A process of recovering substantially pure ethylene from a gas containing ethylene, propylene, and other constituents boiling within substantially the same temperature range, the said process comprising: scrubbing the said gas with a sulfonic acid that has an acidity substantially equivalent to that of a low-molecular weight alkanesulfonic acid in at least 90 weight percent concentration while maintaining a temperature between 20° and 120° C. and effecting removal of propylene from the gas; passing substantially propylene-free gas from the said scrubbing step into direct contact with a sulfonic acid containing from 0.5 to 50 mol percent, based on the acid, of boron trifluoride at a temperature below about 75° C., and esterifying ethylene contained in the gas; removing the so-formed ethyl ester from the gas; stripping boron trifluoride from the ester at a temperature below 80° C.; and heating the ethyl ester, free of boron trifluoride, to a temperature between about 150° and 250° C. thereby liberating substantially pure ethylene.

2. A process of recovering substantially pure ethylene from a gas containing ethylene, propylene and saturated hydrocarbons boiling within the same temperature range, the said process comprising: introducing the said gas into direct contact with an acid selected from a group consisting of a low molecular weight alkanesulfonic acid, arylsulfonic acids and an approximately 70-percent-concentrated sulfuric acid while maintaining the temperature of the gas and acid between 20° and 120° C. and effecting removal of propylene from the gas; passing the gas from the propylene-removal step into contact with an acid complex consisting of an alkanesulfonic acid having less than seven carbon atoms per molecule and from 0.5 to 50 mol percent, based on the acid, of boron trifluoride while maintaining a temperature below about 75° C. and thereby esterifying ethylene contained in the gas; separating from the gas stream a liquid product comprising so-formed ethyl ester, boron trifluoride complexes and unreacted acid; heating the said liquid product to a temperature below 80° C. and stripping dissolved boron trifluoride from the ester; and heating the said ethyl ester, free of boron trifluoride, to a temperature between about 150° and 250° C., thereby liberating substantially pure ethylene.

3. A process of recovering substantially pure ethylene from a gas containing ethylene, propylene, and saturated hydrocarbons boiling within the same range, the said process comprising: introducing the said gas into direct contact with an alkanesulfonic acid having less than seven carbon atoms per molecule while maintaining the reaction temperature between 60° and 120° C. to polymerize propylene contained in the said gas; withdrawing liquid propylene polymer and the alkanesulfonic acid from contact with the gas; passing substantially propylene-free gas from the polymerization step into contact with an acid complex consisting of an alkanesulfonic acid having less than seven carbon atoms per molecule and from 0.5 to 50 mol percent, based on the acid, of boron trifluoride while maintaining a temperature below about 75° C. and thereby esterifying ethylene contained in the gas; separating from the gas stream a liquid product comprising so-formed ethyl ester, boron trifluoride complexes and unreacted acid; heating the said liquid product to a temperature below 80° C. and stripping boron trifluoride therefrom; and heating the ethyl ester, free of boron trifluoride, to a temperature between about 150° and 250° C., thereby liberating substantially pure ethylene.

4. A process of recovering substantially pure ethylene from gas streams containing ethylene, propylene and saturated hydrocarbons boiling within substantially the same temperature range, the said process comprising: introducing the said gas into direct contact with an alkanesulfonic acid having less than seven carbon atoms per molecule while maintaining a temperature between about 10° and 60° C., thereby esterifying propylene contained in the gas stream; withdrawing so-formed liquid propyl alkanesulfonate and any unreacted acid from the gas stream; passing propylene-free gas from the propylene-esterification zone into direct contact with an acid complex consisting of an alkanesulfonic acid having less than seven carbon atoms per molecule and from 0.5 to 50 mol percent, based on the acid, of boron trifluoride while maintaining a temperature below about 75° C. and thereby esterifying ethylene contained in the gas; separating from the gas stream so-formed liquid ethyl ester, boron trifluoride complexes and unreacted acid, heating the said liquid product to a temperature below 80° C. and stripping therefrom boron trifluoride; and heating the said ethyl ester, free of boron trifluoride, to a temperature between about 150° and 250° C., thereby liberating substantially pure ethylene.

5. The process of claim 4 in which the so-formed propyl alkanesulfonate and unreacted acid are heated to a temperature between about 60° and 150° C. to polymerize propylene contained in the withdrawn propyl alkanesulfonate and liberate the sulfonic acid from the ester.

6. A process of recovering substantially pure ethylene from a gas stream containing ethylene, propylene and saturated hydrocarbons boiling within substantially the same range, said process comprising: introducing the said gas continuously into direct contact with at least one mol, per mol of propylene in the said gas, of an alkanesulfonic acid having less than seven carbon atoms per molecule while maintaining a reaction temperature between about 10° to 60° C. to esterify the said propylene and form a propyl alkane sulfonate; withdrawing the liquid propyl alkane sulfonate and any excess acid from contact with the said gas; passing substantially propylene-free gas at superatmospheric pressure into contact with at least one mol of an alkane sulfonic acid, having less than seven carbon atoms per molecule, per mol of ethylene contained in the gas and from 0.5 to 50 mol percent, based on the acid, of boron trifluoride while maintaining a temperature below about 75° C., and thereby esterifying ethylene contained in the gas; separating from the gas stream a liquid product comprising so-formed ethyl ester, boron trifluoride complexes and unreacted acid; heating the said liquid product to a temperature below 80° C. and stripping boron trifluoride from the ester; and heating the said ethyl ester, free of boron trifluoride, to a temperature between about 150° and 250° C., thereby liberating substantially pure ethylene.

7. A process of recovering substantially pure ethylene from a gas containing ethylene, propylene and saturated hydrocarbons boiling within substantially the same temperature range, the said process comprising: introducing the said gas into direct contact with an alkanesulfonic acid having less than seven carbon atoms per molecule and a concentration of at least 90 weight percent while maintaining the temperature of the gas and acid between 20° and 120° C. and effecting removal of propylene from the gas stream; passing substantially propylene-free gas into contact with more than one mol of an alkanesulfonic acid, having less than seven carbon atoms per molecule, per mol of ethylene contained in the gas, and from 0.5 to 50 mol percent, based on the acid, of boron trifluoride while maintaining a temperature between about 20° and 40° C. and thereby esterifying ethylene contained in the gas; separating from the gas stream a liquid product comprising so-formed ethyl alkane sulfonate, boron trifluoride complexes and unreacted acid; heating the said liquid product to a temperature below 80° C. and passing through the product an inert gas consisting of propylene- and ethylene-free saturated gas from the said gas stream to strip boron trifluoride from the ester; and heating the said ethyl ester, free of boron trifluoride, to a temperature between about 150° and 250° C., thereby liberating substantially pure ethylene.

8. A process for recovering substantially pure ethylene from gas containing ethylene, propylene, and saturated hydrocarbons boiling within substantially the same temperature range, the said process comprising: introducing the said gas into direct contact with an alkanesulfonic acid having less than seven carbon atoms per molecule while maintaining a reaction temperature between about 20° and 40° C. to esterify propylenes contained in the said gas; withdrawing so-formed propyl alkanesulfonate and unreacted acid from contact with the gas stream; heating the withdrawn product including the propyl alkanesulfonate to a temperature between about 60° and 150° C. to polymerize propylene contained in the withdrawn ester and liberate alkanesulfonic acid therefrom; recycling alkanesulfonic acid to the propylene esterification step; passing substantially propylene-free gas at a pressure between about 10 and 60 atmospheres into contact with an acid complex consisting of an alkanesulfonic acid having less than seven carbon atoms per molecule and from 5 to 25 mol percent, based on the acid, of boron trifluoride while maintaining a temperature between about 20° and 40° C. and thereby esterifying ethylene contained in the gas; separating from the effluent gas stream, that is substantially ethylene- and propylene-free and contains only saturated hydrocarbons, a liquid product comprising so-formed ethyl alkanesulfonate, boron trifluoride complexes and unreacted acid; heating the said product to a temperature just below about 80° C. and passing through it at least a portion of said effluent gas to strip boron trifluoride from the ester; flowing said effluent saturated gases containing boron trifluoride into contact with alkanesulfonic acid, having less than seven carbon atoms per molecule, to form the said acid complex; recycling the so-formed complex to the ethylene-esterification step; heating the said ethyl ester, free of boron trifluoride, to a temperature between about 150° and 180° C., thereby liberating acid and substantially pure ethylene; and recycling so-liberated acid to prior process steps utilizing acid.

9. In a process for separating substantially pure ethylene and propylene from a gaseous stream which consists of ethylene and propylene admixed with paraffinic hydrocarbons and in which propylene is first separated from the gas stream by contacting the gas with a sulfonic acid and separating the so-formed propylene reaction product, the combination with said propylene recovery of intimately contacting said stream with concentrated alkanesulfonic acid in the presence of between 0.5 and 50 mol percent, based on the acid, of boron trifluoride while maintaining a temperature below about 75° C. and thereby esterifying ethylene contained in the gas to form an alkanesulfonic acid-ethylene ester, introducing liquids from said contacting step into a stripping zone and therein removing boron trifluoride and unreacted hydrocarbons from an alkanesulfonic acid-ester mixture at a temperature below 80° C., and heating the stripped liquid after removal of boron trifluoride therefrom to convert said ester into substantially pure ethylene and alkanesulfonic acid.

10. The process of claim 9 in which the said stripped liquid after removal of boron trifluoride is heated to a temperature between about 150° and 180° C.

ARTHUR P. LIEN.
CARL E. JOHNSON.

References Cited in the file of this patent

UNITED STATES PATENTS

| Number | Name | Date |
|---|---|---|
| 2,065,540 | Schneider | Dec. 29, 1936 |
| 2,257,297 | Groombridge | Sept. 30, 1941 |
| 2,393,895 | Fleming | Jan. 29, 1946 |
| 2,403,010 | Wadley et al. | Sept. 24, 1946 |
| 2,576,535 | Proell | Nov. 27, 1951 |

OTHER REFERENCES

Booth et al., Boron Trifluoride and its Derivatives (Wiley and Sons, N. Y.) 1949, pages 198–200 and 205.